Figure 1:
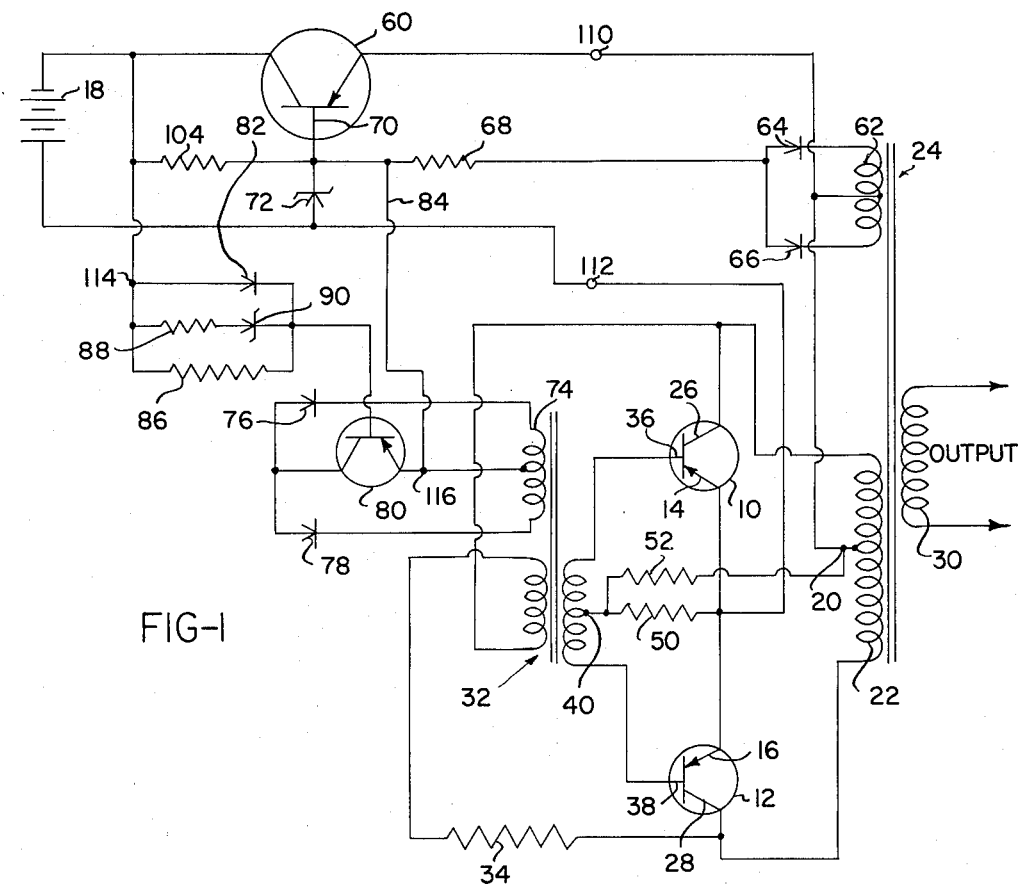

June 9, 1964  D. F. MURPHY  3,136,958
SURGE VOLTAGE PROTECTIVE CIRCUIT FOR TRANSISTOR OSCILLATORS
Filed Oct. 23, 1961

INVENTOR.
DESMOND F. MURPHY
BY
*Milton E. Gilbert*
ATTORNEY

3,136,958
SURGE VOLTAGE PROTECTIVE CIRCUIT FOR TRANSISTOR OSCILLATORS

Desmond F. Murphy, Wayne, N.J., assignor to Globe Industries, Inc., Dayton, Ohio, a corporation of Ohio
Filed Oct. 23, 1961, Ser. No. 147,011
6 Claims. (Cl. 331—62)

The instant invention relates to a transistor oscillator and is more particularly directed to a surge protection circuit for solid state static inverters or oscillators.

The general acceptance of solid state inverters or converters by industry has been largely delayed by the failure of such devices in the presence of high input voltage transients. Such transients have been particularly bothersome in aircraft and missile systems. Many methods have been suggested for protection of such circuits from input voltage surges. In one such system, LC filters have been employed. In another such system, inductance-Zener diode filters have been employed. Such filter circuits have been successful to overcome surges of short duration, but have proven to be cumbersome and inoperative to protect the inverter against longer duration surges. A still further approach has been the use of series regulator elements, which have proven satisfactory for shorter surges, but which have been found to be limited by the maximum allowable power dissipation called for by the specification, during longer surges.

Figure 2:
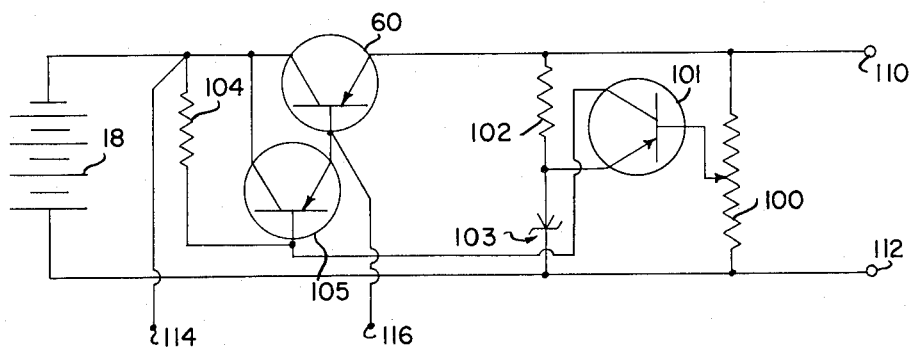

It is therefore one object of the invention to provide a novel surge voltage protection for a transistor oscillator or inverter. A further object of the invention is to provide a surge protection circuit which reduces the current requirements during the surge to limit the power dissipation in a series regulating circuit. These and further objects of the invention will become more readily apparent upon a reading of the description following hereinafter, and upon a consideration of the drawing in which:

FIGURE 1 represents a schematic of a typical solid state inverter incorporating the surge protection circuit of the invention; and FIGURE 2 is a schematic showing a modification of a portion of the surge protection circuit of FIGURE 1.

In the surge protection circuit of the invention, a series regulator type element is employed to absorb the voltage surge; however, means are provided which reduce the current requirements during the surge voltage, thereby limiting the power dissipation across the series element.

As shown in FIGURE 1, a typical solid state inverter circuit is set forth which employs the novel urge protection circuit of the invention.

The transistor oscillator shown comprises a pair of transistors 10 and 12 arranged in push-pull relationship. These transistors are shown as being PNP transistors, but may just as well be NPN transistors. In the configuration shown, the respective emitters 14 and 16 are interconnected to the power source 18, which may be a 28 volt battery, through a network described hereinafter. This network is connected between the common emitters and a center tap 20 of a primary winding 22 of the output transformer 24. The transformer 24 may be provided with a core of iron, ferrite, or other suitable magnetic material. Opposite ends of the transformer primary winding 22 are connected to the respective collector electrodes 26 and 28 of the transistors 10 and 12. The secondary winding 30 of the transformer 24 provides the output and is connected to the load. Positive feedback is provided from the collector transformer 24 to the base transformer 32 by the resistor 34. The secondary of the base transformer 32 has its terminals connected to the base electrodes 36 and 38 of the transistors 10 and 12, respectively. A starting network comprising the resistors 50 and 52 is provided between the center taps 40 and 20 of the transformers 32 and 24, respectively. These resistors function to provide a forward bias to the transistors 10 and 12 in the absence of oscillation. This forward bias and the consequent flow of transistor current aided by any asymmetry in the circuit will cause the start of oscillations.

Although the power source is shown as being a battery, it is readily seen that a generator or other power source may be employed. The power is supplied to the inverter circuit through a series transistor 60. During normal operation the transistor 60 is biased into saturation by a signal picked off of the output transformer 24 through the winding 62. This signal is rectified in the diodes 64 and 66 and applied through a resistor 68 to the base 70 of transistor 60. Power loss across the transistor 60 is negligible in the arrangement shown. A bias also is generated across resistance 104 for starting purposes, where there is no voltage fed through 64 and 66.

An alternate circuit configuration may be employed using the transistor 60 as a regulating element whose bias is derived from an error detector. This alternate configuration is shown in FIGURE 2, wherein only that portion of the circuit of FIGURE 1 appearing between points 110, 112, 114 and 116 is modified. The circuit of FIGURE 2 also serves to convert a variable voltage supply, represented by the battery 18, into a fixed and controllable voltage supply at the terminal points 110, 112. The output voltage between 110, 112 is sensed across the variable resistor 100 and compared with a standard voltage generated across the Zener diode 103. The difference between these voltages is amplified in transistors 101 and 105, i.e., they comprise a two stage amplifier. The resistor 102 serves to establish the standard voltage for the Zener 103. The error signal as thus amplified is used to bias the base of transistor 60, i.e., establish a controllable bias on transistor 60 and thereby set a known drop thereacross. As the power source represented by 18 increases in voltage, the error signal will also increase and as amplified will serve to increase the bias on 60 and hence the drop across 60 will increase accordingly. The resistor 104 and the impedance of transistor 105 form a biasing network for transistor 60.

In the preferred embodiment of FIGURE 1, the bias on the transistor 60 is clamped by the Zener diode 72. The breakdown level of the Zener 72 is set at some point above the maximum normal operating voltage, i.e., above a threshold beyond which the surge is to be removed. The Zener 72 will thus prevent the transistor 60 from passing voltages of levels higher than its breakdown level, and will thus protect the inverting transistors 10 and 12 during the surge conditions.

The transistor 60 must dissipate an amount of power equal to $(E_{surge} - E_{72})(I_{inverter})$.

A transistor may be capable of dissipating large amounts of power for short periods of time. Transistor dissipation is limited by energy or watt-seconds, and therefore a large power surge of long duration would destroy the transistor 60. In order to retain the voltage protection that transistor 60 provides to the switching transistors 10 and 12, while at the same time protecting the transistor 60 itself, the circuit of the invention provides a two-fold protection. In the event a surge of moderate amplitude appears on the power drive, the drive to the transistors 10 and 12 is reduced, thereby reducing the inverter current requirements. In the event a surge of an unmanageably large amplitude appears, the drive to the transistors 10 and 12 is eliminated completely and the inverter is shut down, thereby eliminating the load current completely and protecting the transistor 60 also.

The circuit shown in FIGURE 1, employs the transistors 10 and 12 in a switching mode with the transformer 32 in the base drive circuit saturating periodically to cause phase inversion, and will provide sufficient drive to saturate the transistors 10 and 12 on alternate half cycles. The level of drive of the transformer 32 through the feedback resistor 34 is determined by the transformer design itself, the originating collector drive voltage, and the voltage drop across 34. This mode of operation causes power to be drained away from the transformer 32, thereby reducing its impedance and increasing the voltage drop across resistor 34. The drive to transistors 10 and 12 is consequently reduced. In the extreme case, the transformer 32 will be shorted out completely and oscillation will cease.

The surge protection circuit includes a loading winding 74 which is placed on the transformer 32. The output of this winding is rectified by the diodes 76 and 78 and applied to the transistor 80. The base bias condition of the transistor 80 will determine the amount of loading seen by the transformer 32. If transistor 80 is reversed biased, then there is no load. If the transistor 80 is driven to saturation, then the transformer 32 has shorted out. The bias for transistor 80 is derived from the transistor 60. Transistor 60 is normally in a state of extreme forward bias or saturation. In this condition, the base of transistor 60 is negative with respect to both its emitter and collector. This positive collector to negative base voltage is used as the cutoff or reverse bias for transistor 80. This voltage is that developed across resistor 104. The collector of transistor 60 is coupled to the base of transistor 80 through the diode 82, while the base of transistor 60 is connected directly to the emitter of transistor 80 through lead 84. In this condition, transistor 80 is reverse biased and presents no load to transformer 32.

When a surge appears on the power line, the base to collector polarity of transistor 60 reverses due to the clamping action of the Zener diode 72, and this same voltage appears as a forward bias through resistor 86 to the transistor 80. This forward bias reduces the impedance of transistor 80, and loads transformer 32. The loading of transformer 32 reduces the drive to switching transistors 10 and 12 and thereby reduces the current demand on transistor 60. A shunt path is provided to bias transistor 80 through an impedance lower than resistance 86. This shunt path is formed by the resistance 88 and the Zener diode 90. This path will only come into action at a predetermined level, i.e., the breakdown level of Zener diode 90, and will cause immediate saturation of transistor 80 to shut down the inverter completely.

The surge protection circuit of the invention for a transistor oscillator as above described, comprises three components: a voltage regulating transistor and means to bias its base; a loading or shorting transistor and means to bias its base, and a threshold setting network for the loading transistor. It will be readily understood by those skilled in the art that various rearrangements of elements and circuit modifications may be made while still coming within the spirit and scope of the invention.

What I claim is:
1. A surge protection circuit for a solid state oscillator of the series regulator type including a pair of push-pull switching transistors in common emitter configuration, an output transformer and a base transformer having a loading winding, a primary winding and a secondary winding; said circuit being connected between the common emitters of said transistors and the primary of said output transformer, and comprising a power source and a third transistor having its emitter-collector path in series with said power source, biasing means for the base of said third transistor, means for clamping said latter base bias, and means controlled by said third transistor for determining the loading of said loading winding of said base transformer, whereby when a surge voltage appears at said power source said last named means serves to reduce the drive to said switching transistors.

2. The surge protection circuit of claim 1 wherein the biasing means for the base of said third transistor comprises a rectified signal picked off of the output transformer and applied to the base of said third transistor.

3. The surge protection circuit of claim 1 wherein the means for clamping the base bias of said third transistor comprises a Zener diode in series with the base of said third transistor and whose breakdown level is set at a point above the maximum normal operating voltage of said push-pull transistors.

4. The surge protection circuit of claim 1 wherein said loading winding is on the input side of said base transformer, a fourth transistor, means for rectifying the output of said loading winding and applying the rectified signal to the emitter-collector of said fourth transistor, and biasing means for said fourth transistor derived from said third transistor.

5. The surge protection circuit of claim 4 wherein the biasing means for said fourth transistor includes means for developing the collector to base voltage of said third transistor, means for applying said developed voltage to the base of said fourth transistor, the base of said third transistor being directly connected to the emitter of said fourth transistor.

6. The surge protection circuit of claim 5 wherein the last named means includes a shunt path interconnecting the base of said fourth transistor to receive the said developed voltage, said shunt path including a second Zener diode whose breakdown level is set at a high level to cause immediate saturation of the fourth transistor during large amplitude surges.

References Cited in the file of this patent
UNITED STATES PATENTS

| | | |
|---|---|---|
| 2,832,900 | Ford | Apr. 29, 1958 |
| 2,959,726 | Jensen | Nov. 8, 1960 |
| 2,968,738 | Pintell | Jan. 17, 1961 |
| 2,968,739 | Mohler | Jan. 17, 1961 |